United States Patent [11] 3,567,167

[72] Inventor Walter Koziol
  Russell, Ill.
[21] Appl. No. 794,500
[22] Filed Jan. 28, 1969
[45] Patented Mar. 2, 1971
[73] Assignee Charmglow Manufacturing Company
  Antioch, Ill.

[54] FREELY ENGAGEABLE SUPPORT MEMBER
  3 Claims, 6 Drawing Figs.
[52] U.S. Cl...................................................... 248/223
[51] Int. Cl....................................................A47g 29/00,
  A47f 5/00
[50] Field of Search........................................ 248/73,
  125, 216, 217, 223, 224, 243; 285/208

[56] References Cited
  UNITED STATES PATENTS
967,383 8/1910 Hunter.......................... 248/243UX
2,447,128 8/1948 Logan........................... 248/224

2,587,912 3/1952 Simpson........................ 248/223
3,104,013 9/1963 Fisk............................... 248/223X Primary Examiner—Edward C. Allen
Assistant Examiner—William H. Schultz
Attorney—Neil E. Hamilton ABSTRACT: A freely engageable support member which can be inserted and retained in a hole by means of an engaging end with a lip insertable in the hole and contacting the inner adjacent wall surface of the hole while a center section of the engaging end rests by weight of gravity in the hole and on a portion of the wall forming the lower part of the hole. An outer flange extends downwardly from the center section and contacts the outer surface of the wall adjacent the hole, the lip and the flange preventing the support from falling outwardly when placed in the hole with the support having an object attached to its end opposite the engaging end, the weight of which causes the lip and flange to contact the inner and outer sides of the wall surrounding the hole.

PATENTED MAR 2 1971                    3,567,167
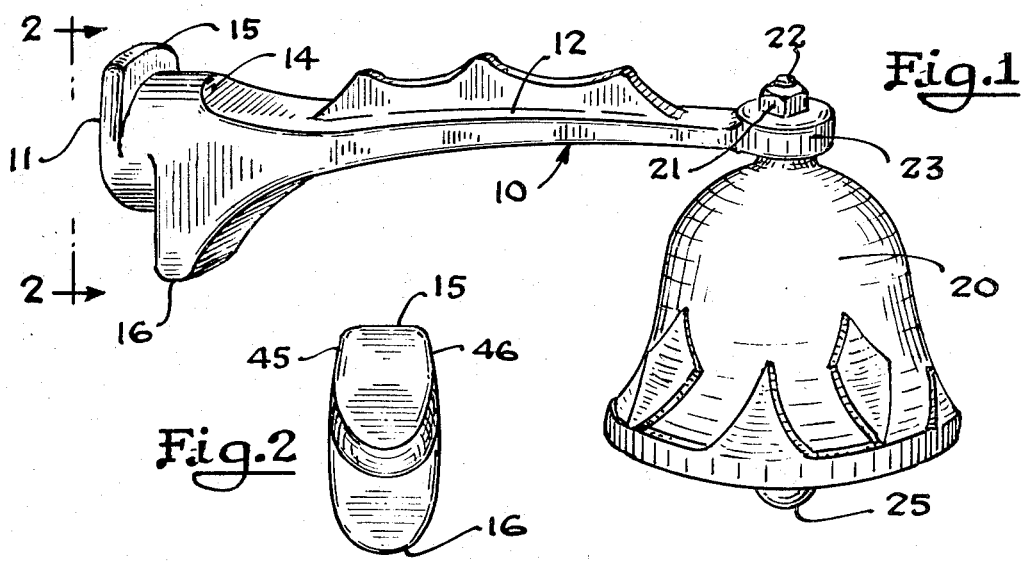
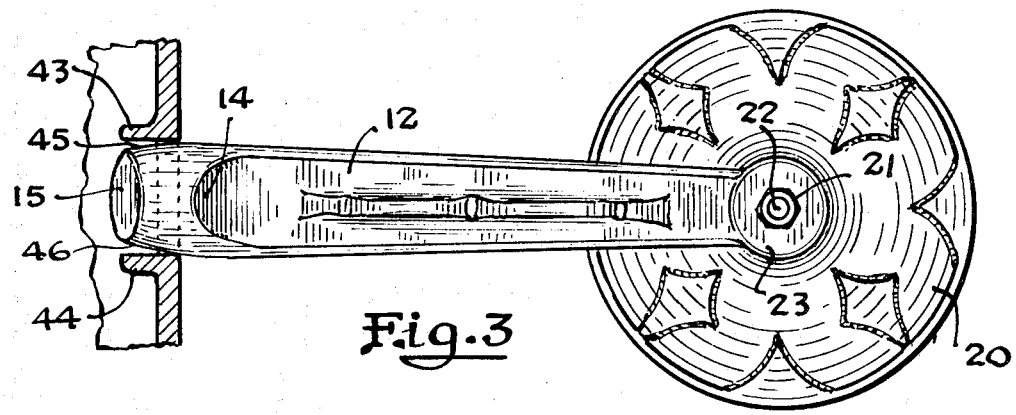
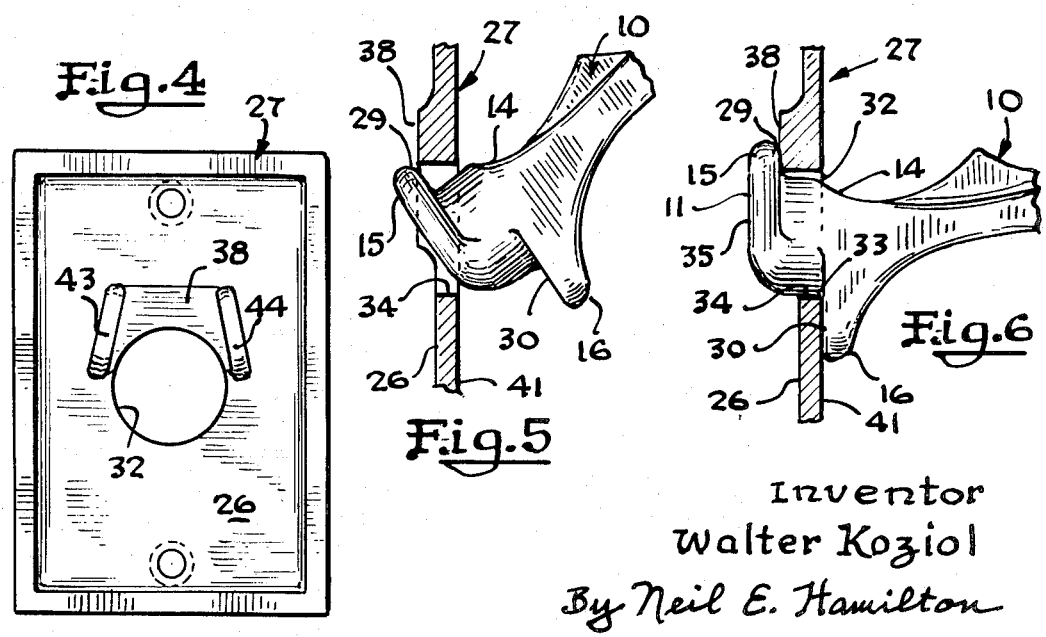
Inventor
Walter Koziol
By Neil E. Hamilton
  Attorney

FREELY ENGAGEABLE SUPPORT MEMBER

BACKGROUND OF THE INVENTION

This invention relates to a support member for insertion in an opening and more particularly, to a support member adapted to be quickly inserted into and cantilevering from an opening and freely carried therein by means of lips and flanges carried by an engaging end of the support member.

Support member of the cantilevered type such as for electric lights, gas lamps or when employed to support a shelf are permanently secured to a bracket which in turn is affixed to a wall or the like. There are available the hooked type supports which fit into slots of a bracket. However, these require either a large degree of manipulation or they are designed with no means of preventing lateral shifting. The prior art nowhere teaches a support member which is simple in design and construction and is securely retained by the wall surfaces surrounding an opening while obviating lateral shifting and a large degree of manipulation. Neither is there available a support member which can be freely yet safely carried by an upstanding wall member and substantially fill the opening into which an engaging end is inserted.

It is an object of the present invention to provide a novel support member which has a minimum number of parts yet is effectively held in a passageway. It is another object of this invention to provide a support member which can be quickly inserted into and removed from an opening. It is still another object of the present invention to provide a support member which can be manufactured without maintaining close tolerances. It is yet another object of this invention to provide a support member which requires minimum manipulation yet for esthetic purposes will substantially fill an opening into which it is inserted.

SUMMARY OF THE INVENTION

The foregoing objects are accomplished and the shortcomings of the prior art are overcome by the present support member which is comprised of an engaging end and an arm member. The engaging member has a center section substantially filling a hole in a panel into which it is inserted. A lip extends outwardly from the center section in one direction and a flange is spaced from the lip and extends outwardly from the center section and in a direction opposite to the direction of the lip. The lip is constructed and arranged to engage an inner portion of the wall when the center section seats in the hole and the flange is disposed outwardly of the hole and adapted to engage an outer portion of the wall. The desired object is supported by the arm opposite the engaging end and extending transversely from the flange and lip.

BRIEF DESCRIPTION OF DRAWINGS

A better understanding of the present support member will be accomplished by reference to the drawing wherein:

FIG. 1 is a perspective view of the support member.

FIG. 2 is a back view in elevation of the support member taken along line 2–2 of FIG. 1.

FIG. 3 is a top view of the support member shown in FIG. 1 with a sectional view taken through a panel section.

FIG. 4 is a back view in elevation of a bracket member representing a panel section with two flanges.

FIG. 5 is a partial view in cross section of the bracket shown in FIG. 4 with the engaging end of the support member being inserted into a hole in the bracket.

FIG. 6 is a view like FIG. 5 with the engaging end of the support member resting in a hole in the bracket and the support member in a normal engaging position.

DESCRIPTION OF THE PREFERRED EMBODIMENT

Proceeding to a detailed description of the present invention, the support member generally 10 is comprised of an engaging end 11 and an arm member 12. Rounded center section 14 forms part of engaging end 11 from which extends outwardly in one direction a lip member 15 and a flange member 16 in the opposite direction and spaced therefrom. A bell 20 is secured to arm 12 at the end opposite to engaging end 11 by nut 21 and bolt 22 passing through annular portion 23 on arm 12 by an accommodating hole with the end opposite to nut 21 interengaging ringer 25. Lip 15 and flange 16 are spaced apart so that a panel portion 26 of a support such as a bracket 27 is accommodated between the inner adjacent surfaces 29 and 30 of lip 15 and flange 16, respectively. Center section 14 is rounded in an elliptical manner to fit in round hole 32 with the bottom portion 33 of center section 14 seated on a section 34 of wall 26 forming hole 32. It will be noted that lip 15 forms an end wall 35 on center section 14. End wall 35, as is center section 14, is constructed with a width slightly less than the width of opening 32 so that center section 14 can be seated in hole 32 with portion 33 resting therein and yet substantially fill the hole.

Referring specifically to FIG. 6, it will be seen that engaging end 11 of support member 10 is constructed and arranged with lip 15 extending a sufficient distance so that the inner face portion 29 contacts an adjacent portion of a raised inner surface 38 of wall 26 when bottom portion 33 of center section 14 rests on bottom section 34 of hole 32. Contact between face portion 29 and surface 38 is maintained by the combined weight of arm 12 and bell 20 tending to pivot engaging end 11 in hole 32 and move downwardly. This also causes the inner surface 30 of flange 16, which extends outwardly a greater distance than lip 15, to tend to come into contact with the outer surface 41 of wall 26. To aid in restricting lateral movement of engaging end 11 when placed in hole 32, two spaced-apart flanges 43 and 44 are disposed adjacent the upper regions of hole 32 for contact with side surfaces 45 and 46 of lip 15. Barlike flanges 43 and 44 are formed in an upwardly converging manner and on each side of surface 38 for better contact with tapering sides 45 and 46 of lip 15.

OPERATION

A better understanding of the advantages of support member 10 will be had by a description of its operation. Arm 12 is grasped between the thumb and forefinger and engaging end 11 is inserted into hole 32 so that end wall 35 is at a slight angle from a vertical position to allow lip 15 to clear adjacent surfaces of wall 26. This is the position of plug member 10 as shown in FIG. 5. The side surfaces 45 and 46 of lip 15 will clear through hole 32 because, as previously stated, they are dimensioned slightly less than the width or diameter of hole 32 and center section 14 is dimensioned in height less than hole 32 to permit the insertion of lip 15. Once lip 15 is to the inside of wall 26, arm 12 is moved downwardly and flange 16 is pivoted toward wall 26 to permit flange 16 to rest against the outer surface of wall 26. In this position, the support member 10 is permitted to drop downwardly by its own weight whereupon it will assume the position shown in FIG. 6 with bottom 33 of center section 14 resting on bottom 34 of hole 32, lip 15 contacting surface 38 and surface 30 of flange 16 contacting outer surface 41 of wall 26. This provides a stable support for bell 20 and also an effective means to substantially close hole 22. To remove support arm 12 from hole 32, the previously described steps are merely reversed.

Support member 10 with engaging end 11 is illustrated for use in a round hole. However, it can be constructed in practically any geometric configuration whether rectangular, oval, triangular or other polygonal shapes to fit within the desired hole configurations. It will also be recognized that any type of fixture can be suspended from a wall panel other than a bell 20. For example, an illuminating fixture such as electric lamp or a lantern could be supported as well as such devices as a bird feeder or ornamental wind chimes. The preferred material for support member 10 and bell 20 is aluminum. However, any rigid or semirigid materials such as other metals and resinous plastics can be used with consideration given to the type of device to be suspended and whether the wall 26 is heated such as if it is a barbecue base structure. If the latter situation prevails, arm 12 should be made from a nonflammable material.

It will thus be seen that through the present invention there is now provided a support member which can be inserted and freely carried in a hole without permanently attached moving parts, such as hinges or flexing portions, yet has a minimum number of parts. The support can be quickly inserted in and removed from a hole without requiring close tolerances of the parts comprising the engaging end yet it effectively closes a hole for good appearances. No special molds need be designed to manufacture the support nor any special tooling. The support is inexpensive to manufacture yet highly functional as it can be adapted to support a variety of devices.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A freely engageable support member insertable and freely carried in a hole in a panel section comprising an engaging end and an arm member, a center section carried by said engaging end for seating in said hole, a lip extending outwardly from said center section and in one direction, a flange spaced from and extending outwardly from said center section and in a direction opposite to said one direction, said lip constructed and arranged to engage an inner, upward portion of said panel when said center section seats in said hole and said flange is disposed outwardly of said hole and adapted to engage an outer portion of said panel, and spaced-apart flanges carried internally by said panel section and arranged to engage said lip and restrict lateral movement of said engaging end.

2. The support member as defined in claim 1 wherein said engaging end is constructed and arranged to engage a round hole and is substantially elliptical in cross section, said flanges comprising two spaced-apart flanges carried by said panel section and adjacent said hole, said flanges being disposed in an upwardly converging manner and constructed and arranged to restrict lateral movement of said lip.

3. The support member as defined in claim 2 further including a stop surface disposed between said flanges and constructed and arranged to engage said lip.